(12) United States Patent
Tokunaga et al.

(10) Patent No.: US 11,260,856 B2
(45) Date of Patent: Mar. 1, 2022

(54) INFORMATION DISPLAY DEVICE, INFORMATION DISPLAY METHOD, AND RECORDING MEDIUM

(71) Applicant: Panasonic Intellectual Property Management Co., Ltd., Osaka (JP)

(72) Inventors: Daisuke Tokunaga, Osaka (JP); Nobuyuki Nakano, Aichi (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 16/561,970

(22) Filed: Sep. 5, 2019

(65) Prior Publication Data

US 2019/0389460 A1 Dec. 26, 2019

Related U.S. Application Data

(63) Continuation of application No. PCT/JP2018/001862, filed on Jan. 23, 2018.

(30) Foreign Application Priority Data

Mar. 24, 2017 (JP) .............................. JP2017-059993

(51) Int. Cl.
*B60W 30/095* (2012.01)
*G06K 9/00* (2022.01)
(Continued)

(52) U.S. Cl.
CPC ......... *B60W 30/0956* (2013.01); *B60K 35/00* (2013.01); *B60R 1/00* (2013.01);
(Continued)

(58) Field of Classification Search
CPC ........ B60K 9/00805; B60K 2370/1529; B60R 1/00; B60R 2300/308;
(Continued)

(56) References Cited

U.S. PATENT DOCUMENTS 6,292,753 B1    9/2001   Sugimoto et al.
7,605,773 B2 *  10/2009  Janssen .................. B60K 35/00
                                                              345/7
(Continued)

FOREIGN PATENT DOCUMENTS

EP    1650725 A1 *  4/2006 ............... G08G 1/16
JP    5-050934         3/1993
(Continued)

OTHER PUBLICATIONS

International Search Report of PCT application No. PCT/JP2018/001862 dated Apr. 17, 2018.
(Continued)

*Primary Examiner* — Calvin Cheung
(74) *Attorney, Agent, or Firm* — Greenblum & Bernstein, P.L.C.

(57) ABSTRACT

An information display device includes a surrounding environment detector, a vehicle information acquirer, a predictor, an avoidance path provider, and an information display. The surrounding environment detector detects position relevant information related to a position of at least a surrounding object in a surrounding environment of a vehicle. The vehicle information acquirer detects vehicle information including a speed and a steering direction of the vehicle. The predictor predicts a contact of the vehicle with the surrounding object, based on the position relevant information and the vehicle information. When the predictor has predicted that there is a possibility of the contact of the vehicle with the surrounding object, the avoidance path provider assumes
(Continued)

an avoidance path for avoiding the contact, based on the position relevant information and the vehicle information. The information display displays the avoidance path.

6 Claims, 6 Drawing Sheets

(51) Int. Cl.
  *B60K 35/00* (2006.01)
  *B60R 1/00* (2022.01)
(52) U.S. Cl.
  CPC ..... *B60W 30/0953* (2013.01); *G06K 9/00805* (2013.01); *B60K 2370/1529* (2019.05); *B60R 2300/308* (2013.01); *B60R 2300/8086* (2013.01); *B60R 2300/8093* (2013.01); *B60W 2554/00* (2020.02); *B60W 2720/24* (2013.01)
(58) Field of Classification Search
  CPC ............... B60R 2300/8086–8093; B60W 30/0953–0956; B60W 2554/00; B60W 2720/24
  See application file for complete search history.

(56) References Cited

U.S. PATENT DOCUMENTS

| | | | |
|---|---|---|---|
| 2016/0110618 A1 | 4/2016 | Oba | |
| 2017/0274931 A1* | 9/2017 | Yang | G01C 21/3661 |
| 2018/0079359 A1* | 3/2018 | Park | G01S 13/931 |
| 2018/0208199 A1 | 7/2018 | Fujita et al. | |

FOREIGN PATENT DOCUMENTS

| | | | | |
|---|---|---|---|---|
| JP | 6-180800 | | 6/1994 | |
| JP | 7-266925 | | 10/1995 | |
| JP | 11-227582 | | 8/1999 | |
| JP | 2000-339595 | | 12/2000 | |
| JP | 2005-135037 | | 5/2005 | |
| JP | 2008-009843 | | 1/2008 | |
| JP | 2014-239326 | | 12/2014 | |
| JP | 2017-033542 | | 2/2017 | |
| KR | 1020160035876 | * | 3/2016 | ............ B60W 50/14 |
| WO | 2017/013750 A1 | | 1/2017 | |

OTHER PUBLICATIONS

Japanese Office Action dated Jun. 2, 2020 for the related Japanese Patent Application No. 2017-059993.

* cited by examiner

INFORMATION DISPLAY DEVICE, INFORMATION DISPLAY METHOD, AND RECORDING MEDIUM

CROSS-REFERENCE TO RELATED APPLICATIONS

This application is a continuation of the PCT International Application No. PCT/JP2018/001862 filed on Jan. 23, 2018, which claims the benefit of foreign priority of Japanese patent application No. 2017-059993 filed on Mar. 24, 2017, the contents all of which are incorporated herein by reference.

BACKGROUND

1. Technical Field

The present disclosure relates to an information display device, an information display method, and a recording medium storing a program for showing, to a user, the information related to surrounding objects in a surrounding environment of a vehicle.

2. Description of the Related Art

Japanese Unexamined Patent Publication No. 2005-135037 discloses a display device and the like showing a circumferential state of a vehicle to a driver. The information shown to the driver includes an alert for calling an attention to an obstacle, for example.

SUMMARY

The present disclosure provides an information display device, an information display method, and a recording medium storing a program that allow an alert display capable of reducing the inconvenience.

The information display device of one aspect of the present disclosure includes a surrounding environment detector, a vehicle information acquirer, a predictor, an avoidance path provider, and an information display. The surrounding environment detector detects position relevant information related to a position of at least a surrounding object in a surrounding environment of a vehicle. The vehicle information acquirer detects vehicle information including a speed and a steering direction of the vehicle. The predictor predicts a contact of the vehicle with the surrounding object on the basis of the position relevant information and the vehicle information. When the predictor has predicted that there is a possibility of the contact of the vehicle with the surrounding object, the avoidance path provider assumes an avoidance path for avoiding the contact on the basis of the position relevant information and the vehicle information. The information display displays the avoidance path.

The general or specific aspects may be achieved by a system, a method, an integrated circuit, a computer program, or a recording medium such as a computer-readable compact disc read-only memory (CD-ROM). Alternatively, the aspects may be achieved by any combination of a system, a method, an integrated circuit, a computer program, and a recording medium.

The above-mentioned aspects can provide an information display device, an information display method, and a recording medium storing a program that allow the alert display capable of reducing the inconvenience.

DETAILED DESCRIPTION OF PREFERRED EMBODIMENTS

Prior to the description of an exemplary embodiment of the present disclosure, problems in a conventional technology are briefly described. In Japanese Unexamined Patent Publication No. 2005-135037, when a plurality of obstacles exist, alerts corresponding to all obstacles are displayed. Therefore, there is a possibility that the driver feels inconvenience.

An information display device of one aspect of the present disclosure includes a surrounding environment detector, a vehicle information acquirer, a predictor, an avoidance path provider, and an information display. The surrounding environment detector detects position relevant information related to a position of at least a surrounding object in a surrounding environment of a vehicle. The vehicle information acquirer detects vehicle information including a speed and a steering direction of the vehicle. The predictor predicts a contact of the vehicle with the surrounding object on the basis of the position relevant information and the vehicle information. When the predictor has predicted that there is a possibility of the contact of the vehicle with the surrounding object, the avoidance path provider assumes an avoidance path for avoiding the contact on the basis of the position relevant information and the vehicle information. The information display displays the avoidance path.

Meanwhile, an information display method of another aspect of the present disclosure includes detecting position relevant information related to a position of at least a surrounding object in a surrounding environment of a vehicle. The information display method further includes detecting vehicle information including a speed and a steering direction of the vehicle. Furthermore, the information display method includes predicting a contact of the vehicle with the surrounding objects on the basis of the position relevant information and the vehicle information. Furthermore, the information display method includes assuming an avoidance path for avoiding the contact of the vehicle with the surrounding objects on the basis of the position relevant information and the vehicle information when it has been predicted that there is a possibility of the contact. Furthermore, the information display method includes displaying the avoidance path.

Furthermore, a program stored in a recording medium of yet another aspect of the present disclosure causes a computer to execute the information display method.

According to these information display device, information display method, and program, even when alerts corresponding to surrounding objects becoming a plurality of obstacles are not individually displayed, an avoidance path for avoiding these objects is alert-displayed. Therefore, the inconvenience can be reduced.

Furthermore, the information display may display a risk of the contact together with the avoidance path.

According to this, the risk is displayed together with the avoidance path. Therefore, the present risk can be shown to the driver, and the driver can also perform the driving according to the risk.

Furthermore, the information display may display the risk in association with the speed of the vehicle.

Therefore, the driver can be notified of both the present speed of the vehicle and the risk.

When the risk has a predetermined value or more, furthermore, the information display may display a deceleration request indication for requesting the driver to decelerate the vehicle.

In this case, the deceleration request indication is displayed when the risk has the predetermined value or more, so that the driver can be urged to perform the deceleration.

When the risk has the predetermined value or more, the information display may display a warning sound request indication for requesting the driver to make a warning sound notification of the vehicle.

In this case, warning-sound notification request information is displayed when the risk has the predetermined value or more, so that the driver can be urged to perform the warning sound notification.

The general or specific aspects may be achieved by a system, a method, an integrated circuit, a computer program, or a recording medium such as a computer readable CD-ROM. Alternatively, the aspects may be achieved by any combination of a system, a method, an integrated circuit, a computer program, or a recording medium.

Hereinafter, the information display device of one aspect of the present disclosure is specifically described with reference to drawings.

Here, any exemplary embodiment described later shows one specific example of the present disclosure. The numerical values, the shapes, the materials, the components, the arrangement positions and the connection form of the components, the steps, and the sequence of the steps show one example, and do not intend to limit the present disclosure. Of the components in the following exemplary embodiment, the components that are not described in the independent claim showing the top-level concept are described as any optional components.

First Exemplary Embodiment

1. Configuration

Figure 1:
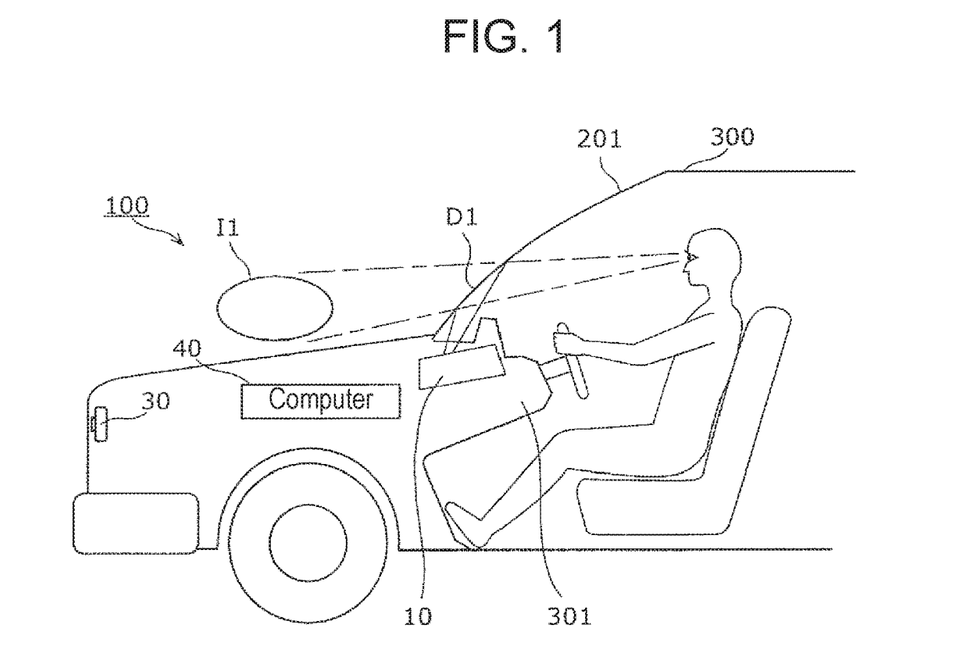
FIG. 1 is a diagram showing a usage example of an information display device according to an exemplary embodiment.

FIG. 1 is a diagram showing a usage example of information display device 100 according to a first exemplary embodiment.

Information display device 100 according to the first exemplary embodiment includes display device 10, camera 30, and computer 40.

Display device 10 is configured as an on-vehicle head up display (HUD), and is mounted near the upper surface of dashboard 301 of vehicle 300.

Display device 10 projects light to display region D1 of windshield 201, which functions as a display medium. The projected light is reflected by windshield 201. The reflected light travels to the eyes of the driver sitting on the driver's seat. Here, the driver is a user of display device 10. The driver sees the reflected light having entered the eyes, and captures it as virtual image I1 seen on the opposite side to windshield 201, namely outside the vehicle. At this time, an actual object that is seen through windshield 201 serves as the background. In other words, display device 10 displays virtual image I1 using windshield 201.

Camera 30 takes an image of a place around vehicle 300. Camera 30 is specifically disposed on the front side of vehicle 300 in the attitude facing forward, and takes the image of a place on the front side of vehicle 300. Camera 30 takes the images of the front side of vehicle 300 at a plurality of different timings. Specifically, camera 30 takes the images of the front side of vehicle 300 at a predetermined cycle. The predetermined cycle includes $\frac{1}{20}$ [sec], $\frac{1}{30}$ [sec], and $\frac{1}{60}$ [sec], for example. Camera 30 not only may take the image of the front side of vehicle 300, but also may take the image of the right side of vehicle 300, may take the image of the left side of vehicle 300, or may take the image of the rear side of vehicle 300. These images may be combined. Camera 30 may be capable of acquiring distance information showing the distance to an imaging object. For example, camera 30 may be the following camera: a stereo camera; a time of flight (TOF) camera; a light detection and ranging (LiFAR); or a millimeter wave sensor. Camera 30 may take a still image or a moving image as an image.

Computer 40 performs: acquiring the image taken by camera 30; executing a predetermined image analysis using the acquired image; generating an image to be displayed by display device 10 by using the result of the image analysis and the vehicle information described later; and causing display device 10 to display the generated image. Computer 40 includes a processor, and a memory storing a program.

Figure 2:
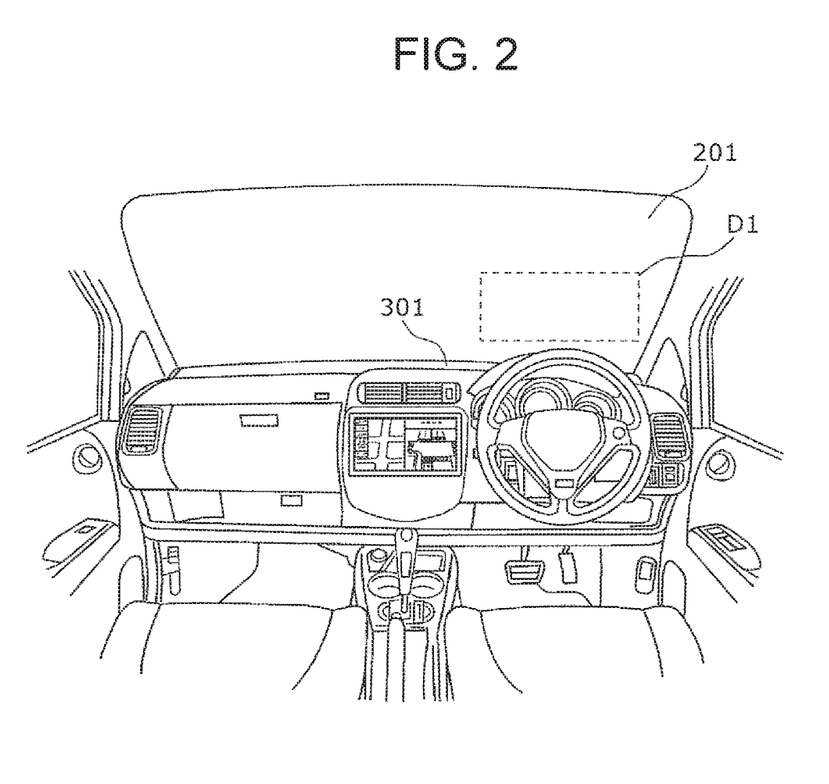
FIG. 2 is a diagram showing one example of a display region, as a region to which light is projected by the display device according to the exemplary embodiment.

FIG. 2 is a diagram showing one example of display region D1, as a region to which light is projected by display device 10 according to the first exemplary embodiment.

As shown in FIG. 2, display device 10 mounted on dashboard 301 projects the light to display region D1, which is located on the driver's seat side and the lower side of windshield 201, for example. Display region D1 is surrounded by the dashed line in the drawing. Thus, virtual image I1, which is seen on the opposite side to windshield 201 when viewed from the driver sitting on the driver's seat, is displayed.

Figure 3:
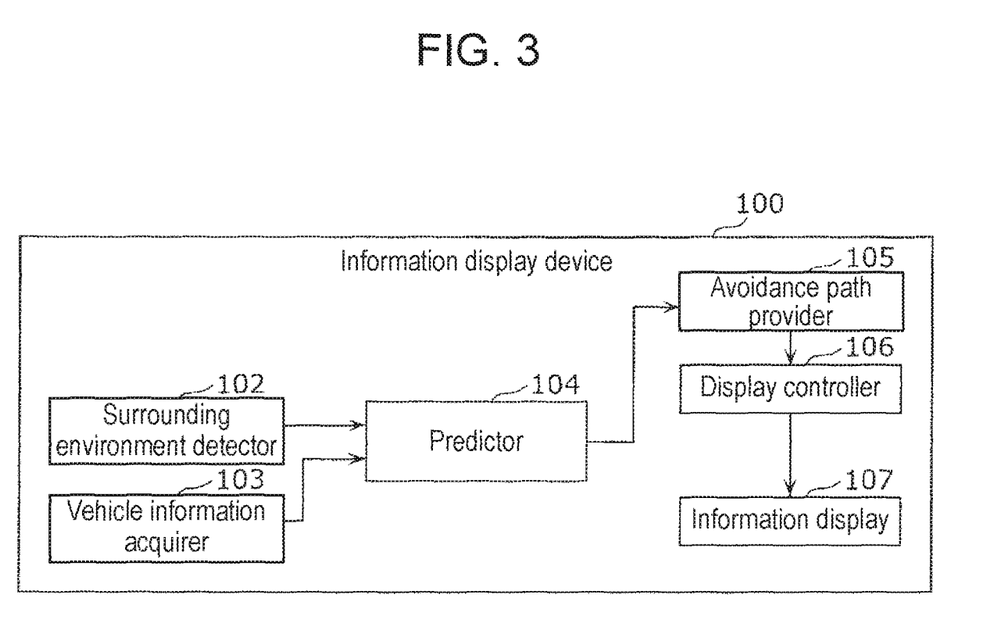
FIG. 3 is a block diagram showing one example of a functional configuration of the information display device according to the exemplary embodiment.

FIG. 3 is a block diagram showing one example of a functional configuration of information display device 100 according to the first exemplary embodiment.

Information display device 100 includes, as functional elements, surrounding environment detector 102, vehicle information acquirer 103, predictor 104, avoidance path provider 105, display controller 106, and information display 107.

Surrounding environment detector 102 detects position relevant information related to a position of at least a surrounding object in a surrounding environment of vehicle 300.

The position relevant information includes: a relative position of the surrounding object to vehicle 300; motion distribution of the surrounding object with respect to vehicle 300; and information of the road on which vehicle 300 is travelling.

Surrounding environment detector 102, specifically, applies a predetermined moving-image analysis to a plurality of taken moving-images of the front side of vehicle 300. Thus, surrounding environment detector 102 detects relative positions to vehicle 300 of pedestrians, the other vehicles, and the other objects, namely detects distances and directions from vehicle 300. Alternatively, surrounding environment detector 102 detects the relative positions to vehicle 300 of pedestrians, the other vehicles, and the other objects, and detects the motion distribution as the relative movements to vehicle 300 thereof. Here, the other vehicles include bicycles and motorcycles.

Surrounding environment detector 102 acquires road information of the surrounding of vehicle 300 from map information stored in a memory of computer 40 for example, and detects the route of the road on which vehicle 300 is travelling and the number of lanes of the road. Surrounding environment detector 102 may acquire the map information from a navigation device separate from information display device 100, or may acquire the map information via a network. Surrounding environment detector 102 is configured from camera 30 and computer 40, for example. Surrounding environment detector 102 may acquire surrounding sensing information from an apparatus, which is separate from information display device 100, or may acquire the position relevant information from the surrounding sensing information Surrounding environment detector 102 may intensively treat, as the surrounding object, a person or object existing on a travel path of vehicle 300. Alternatively, surrounding environment detector 102 may intensively treat, as the surrounding object, a person or object assumed to cross the travel path of vehicle 300 on the front side of vehicle 300.

Vehicle information acquirer 103 detects vehicle information including a speed and a steering direction of vehicle 300. Specifically, vehicle information acquirer 103 includes a vehicle speed detector for detecting the speed of vehicle 300, and includes a steering direction detector for detecting the steering direction of vehicle 300. The steering direction is also a travel direction of vehicle 300.

The vehicle speed detector is achieved by a speedometer or the like of vehicle 300, for example. The steering direction detector may be achieved by one of following sensors: a sensor for detecting the angle of the steering; a sensor for detecting the direction of the front wheel; a global positioning system (GPS) module: and an on-vehicle G sensor.

Predictor 104 predicts the contact of vehicle 300 with the surrounding object, on the basis of the position relevant information detected by surrounding environment detector 102 and the vehicle information detected by vehicle information acquirer 103.

Specifically, predictor 104 extracts, from the position relevant information detected by surrounding environment detector 102, the relative position of the surrounding object to vehicle 300 and the motion distribution of the surrounding object with respect to vehicle 300. Predictor 104 extracts the speed and the steering direction of vehicle 300 from the vehicle information that is detected by vehicle information acquirer 103.

Predictor 104 determines a present risk of the contact with the surrounding object, on the basis of the following parameters: the relative position of the surrounding object to vehicle 300; the motion distribution of the surrounding object with respect to vehicle 300; and the speed and the steering direction of vehicle 300. Here, the risk means an index showing the possibility that vehicle 300 comes into contact with a surrounding object at the present speed and the steering direction.

Predictor 104 calculates the distances between the surrounding object and vehicle 300 on the basis of the relative position of the surrounding object to vehicle 300. Predictor 104 also calculates a subsequent moving direction and a subsequent moving speed of the surrounding object on the basis of the motion distribution of the surrounding object with respect to vehicle 300. Predictor 104 determines the risk on the basis of the following parameters: the distance between the surrounding object and vehicle 300; the moving direction and the moving speed of the surrounding object; and the speed and the steering direction of vehicle 300.

For example, the risk is low when the distance between the surrounding object and vehicle 300 is long, and the risk is high when the distance is short. When the moving direction of the surrounding object does not face to the lane on which vehicle 300 travels, the risk is low. When the moving direction faces to the lane, the risk is high. Furthermore, when the moving direction of the surrounding object faces to the vehicle side and the moving speed is low, the risk is low. When the moving direction of the surrounding object faces to the vehicle side and the moving speed is high, the risk is high. The risk is low when the speed of vehicle 300 is low, and the risk is high when the speed is high. When the junction point predicted from the speed and the steering direction of vehicle 300 and from the moving direction and the moving speed of the surrounding object is far from a present location of vehicle 300, the risk is low. When the junction point is close to the present location of vehicle 300, the risk is high. Predictor 104 determines the risk by compositely using these phenomena.

Here, predictor 104 is formed of computer 40, for example.

When predictor 104 has predicted that there is a possibility of a contact of vehicle 300 with the surrounding object, avoidance path provider 105 assumes an avoidance path for avoiding the contact on the basis of the position relevant information and the vehicle information.

Here, "there is a possibility of a contact" means that the risk exceeds a reference value. The reference value means the value allowing the determination that continuous travelling of vehicle 300 in the same condition with the reference value after the time when the prediction is made does not greatly affect the travel of vehicle 300. In other words, it is assumed that, when the predicted risk exceeds the reference value, the contact of vehicle 300 with the surrounding object becomes a reality. The reference value can be determined on the basis of various simulations, experiments, and empirical rules.

Specifically, avoidance path provider 105 assumes an avoidance path for avoiding the contact of vehicle 300 with the surrounding object on the basis of the following parameters: the relative position of the surrounding object to vehicle 300; the motion distribution of the surrounding object with respect to vehicle 300; the road information; and the speed and steering direction of vehicle 300. Avoidance path provider 105 acquires the number of lanes of the road on which vehicle 300 is travelling in the same travel direction on the basis of the road information, and assumes the avoidance path when the number of lanes is two or more. Avoidance path provider 105 assumes the avoidance path within the range that does not deviate from the two or more lanes. In other words, when the number of lanes of the road on which vehicle 300 is presently travelling is one, the avoidance path is not assumed. Here, when the absence of the other vehicle in the opposite lane can be determined, the avoidance path including the opposite lane can be assumed.

Avoidance path provider 105 is formed of computer 40, for example.

Display controller 106 controls information display 107 to display various pieces of information in display region D1 as the predetermined display region. Specifically, display controller 106 controls information display 107 to display, in display region D1, the avoidance path assumed by avoidance path provider 105.

Display controller 106 is formed of computer 40, for example.

Information display 107 displays the various pieces of information in display region D1 on the basis of the control of display controller 106. Specifically, information display 107 is achieved by display device 10, and displays the avoidance path in display region D1 on the basis of the control of display controller 106.

2. Operation

Next, the operation of information display device 100 is described.

Figure 4:
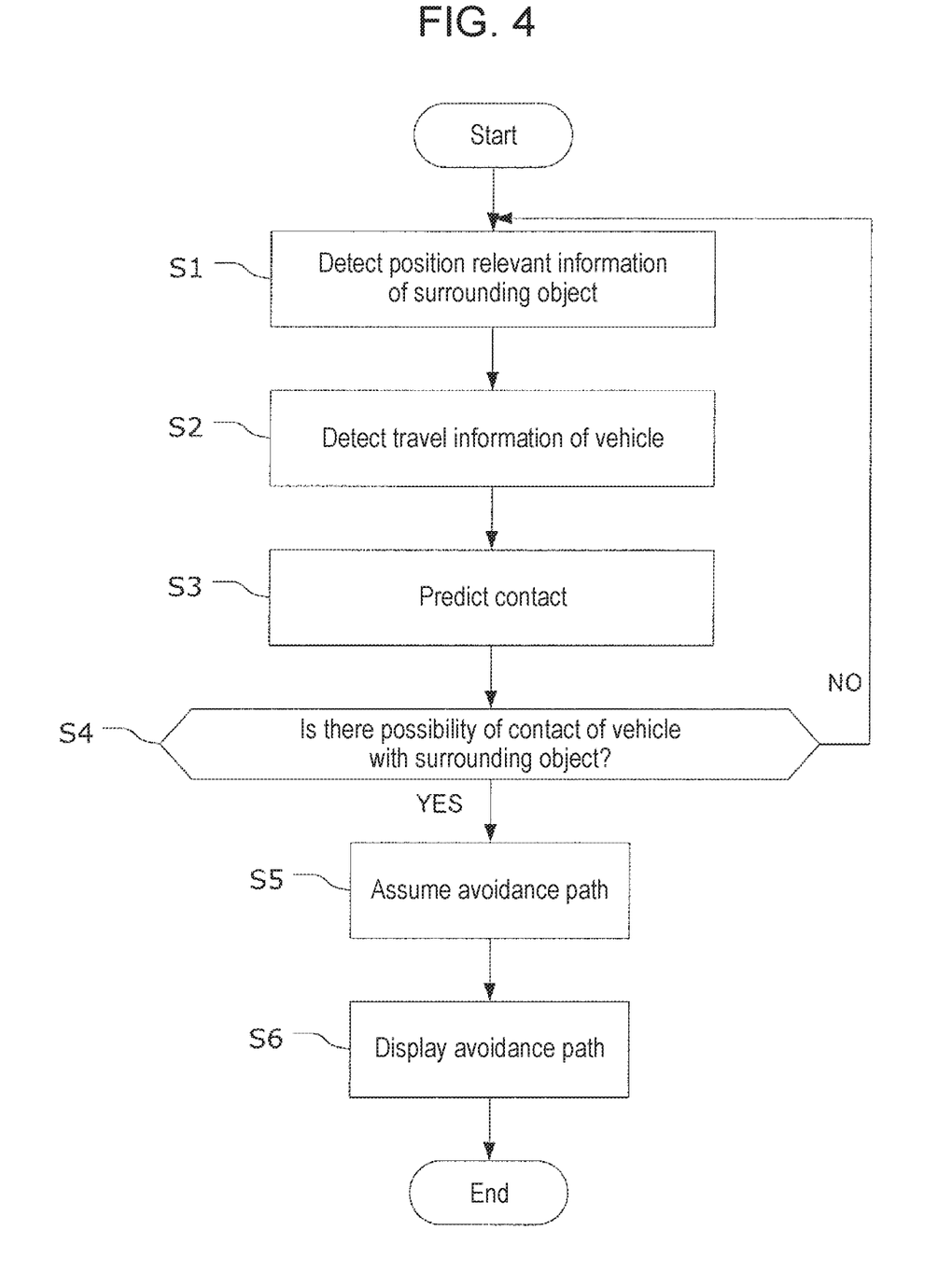
FIG. 4 is a flowchart for describing an information display method according to the exemplary embodiment.
Figure 5:
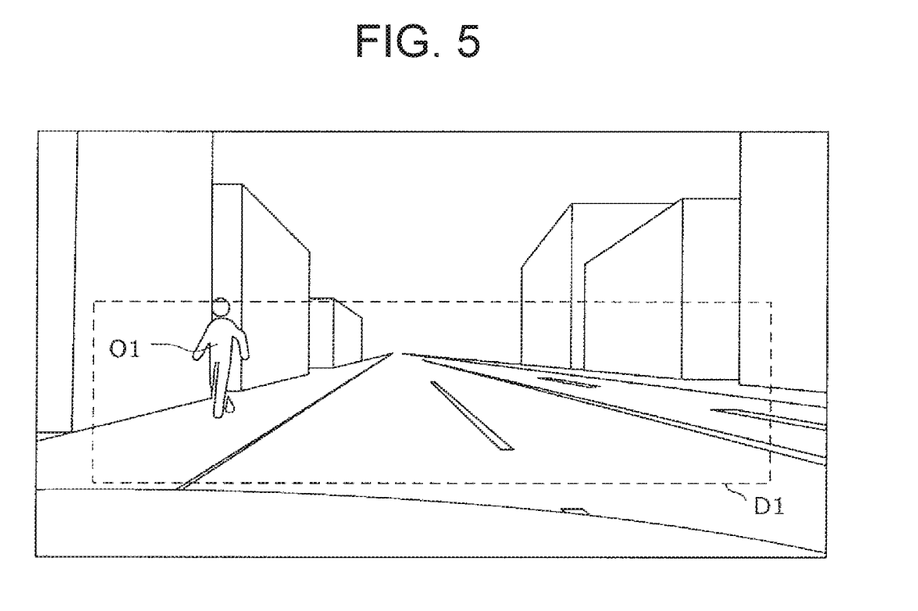
FIG. 5 is an explanatory diagram showing one example of a surrounding environment of a vehicle according to the exemplary embodiment.
Figure 6:
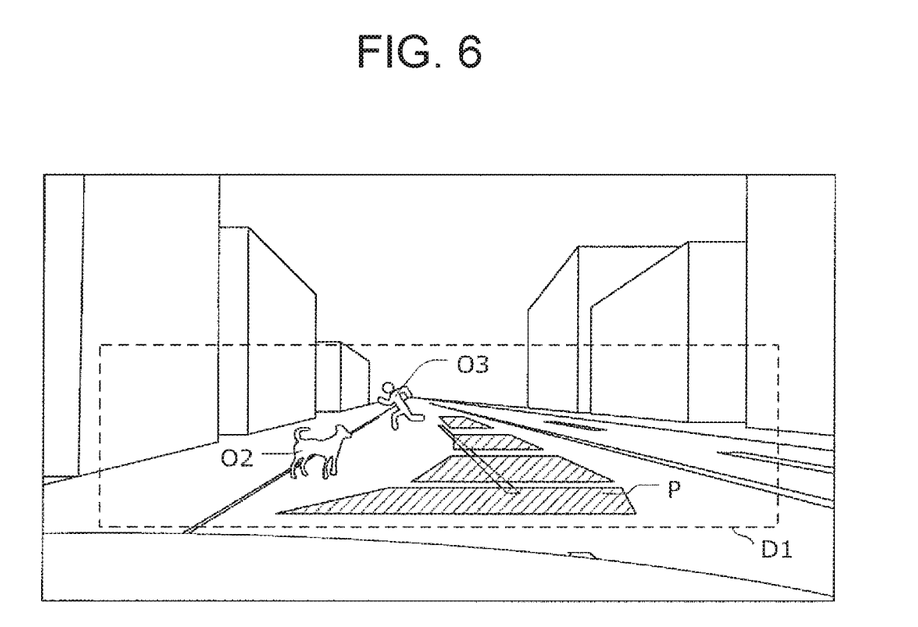
FIG. 6 is an explanatory diagram showing another example of the surrounding environment of the vehicle according to the exemplary embodiment.

FIG. 4 is a flowchart for describing the information display method according to the first exemplary embodiment. FIG. 5 and FIG. 6 are explanatory diagrams showing examples of a surrounding environment of vehicle 300 according to the first exemplary embodiment. Specifically, FIG. 5 shows the state in which no avoidance path is displayed, and FIG. 6 shows the state in which an avoidance path is displayed.

This information display method is achieved by a program stored in the memory of computer 40. In the first exemplary embodiment, persons and animals are assumed to be surrounding objects. In other words, in this case, surrounding environment detector 102 exemplifies the case where the structures such as buildings around vehicle 300 and the other vehicles are not assumed to be surrounding objects. However, these objects may be assumed to be surrounding objects. The persons and animals can be discriminated from the structures and vehicles by estimating the outer shapes and sizes from the taken video thereof.

As shown in FIG. 4, information display device 100, firstly, detects the position relevant information by surrounding environment detector 102 (S1). For example, surrounding environment detector 102 acquires the position relevant information in the states shown in FIG. 5 and FIG. 6. In this case, the position relevant information includes the following parameters: the relative positions of surrounding objects O1, O2, and O3 to vehicle 300; the motion distribution of surrounding objects O1, O2, and O3 with respect to vehicle 300; and, the information of the road on which vehicle 300 is travelling.

Next, information display device 100 detects the vehicle information by vehicle information acquirer 103 (S2).

Next, information display device 100 predicts, by predictor 104, the contact of vehicle 300 with each of surrounding objects O1, O2, and O3 on the basis of the following parameters: the position relevant information detected by surrounding environment detector 102; and the vehicle information detected by vehicle information acquirer 103 (S3). Specifically, predictor 104 determines the present risk of the contact with each of surrounding objects O1, O2, and O3 on the basis of the following parameters: the relative positions of surrounding objects O1, O2, and O3 to vehicle 300; the motion distribution of surrounding objects O1, O2, and O3 with respect to vehicle 300; and, the speed and the steering direction of vehicle 300.

Next, in information display device 100, when the risk predicted by predictor 104 is a reference value or less, namely, when it is predicted that there is no possibility of the contact of vehicle 300 with each of surrounding objects O1, O2, and O3 (S4; NO), the processing goes to step S1.

For example, in the state shown in FIG. 5, surrounding object O1 is a pedestrian who walks without deviating from a sidewalk. For such surrounding object O1, the junction point predicted from the moving direction and the moving speed of surrounding object O1 and from the speed and the steering direction of vehicle 300 is far from vehicle 300, so that the risk is also lower than the reference value. Thus, as shown in FIG. 5, avoidance path P is not displayed in display region D1.

On the other hand, in information display device 100, when the risk predicted by predictor 104 is a reference value or more, namely, when it is predicted that there is a possibility of the contact of vehicle 300 with surrounding object O1, O2, or O3 (S4; YES), the processing goes to step S5.

For example, in the state shown in FIG. 6, surrounding object O2 is a dog having intruded into the same lane as that on which vehicle 300 is travelling. Surrounding object O3 is a pedestrian who crosses the same lane as that on which vehicle 300 is travelling. Furthermore, surrounding object O2 is closer to vehicle 300 than surrounding object O3 is. Therefore, when surrounding objects O2 and O3 are compared with each other, the risk of surrounding object O3 is lower. Therefore, as the whole environment at this time, the risk of surrounding object O2 has a higher priority. In other words, the risk that can be caused by vehicle 300 at this time exceeds the reference value.

Next, information display device 100 assumes, by avoidance path provider 105, avoidance path P for avoiding the contact with each of surrounding objects O2 and O3 on the basis of the position relevant information and the vehicle information (S5). At this time, avoidance path provider 105 assumes avoidance path P capable of avoiding all surrounding objects O2 and O3 whose risks have been predicted.

Next, in information display device 100, information display 107 displays avoidance path P in display region D1 on the basis of the control of display controller 106 (S6). In FIG. 6, avoidance path P formed of intermittently arranged rectangles is displayed so as to overlap with the road. Here, avoidance path P may displayed in any display form. For example, a display imitating an arrow may be used.

The driver can perform a driving that follows avoidance path P by seeing avoidance path P.

3. Advantage or the Like

Information display device 100 according to the first exemplary embodiment includes surrounding environment detector 102, vehicle information acquirer 103, predictor 104, avoidance path provider 105, and information display 107. Surrounding environment detector 102 detects position relevant information related to the positions of at least surrounding objects O1, O2, and O3 in the surrounding environment of vehicle 300. Vehicle information acquirer 103 detects vehicle information including the speed and the steering direction of vehicle 300. Predictor 104 predicts the contact of vehicle 300 with surrounding object O1, O2, or O3, on the basis of the position relevant information and the vehicle information. When predictor 104 has predicted that there is a possibility of the contact, avoidance path provider 105 assumes avoidance path P for avoiding the contact on the basis of the position relevant information and vehicle information. Information display 107 displays avoidance path P While, the information display method of the first exemplary embodiment includes detecting the position relevant information related to the positions of at least surrounding objects O1, O2, and O3 in the surrounding environment of vehicle 300. The information display method further includes detecting the vehicle information including the speed and the steering direction of vehicle 300. Furthermore, the information display method includes predicting the contact of the vehicle with the surrounding object on the basis of the position relevant information and the vehicle information. Furthermore, the information display method includes assuming an avoidance path for avoiding the contact with surrounding object O1, O2, or O3 on the basis of the position relevant information and the vehicle information when it has been predicted that there is a possibility of the contact. Furthermore, the information display method includes the step of displaying avoidance path P.

In this configuration, when it has been predicted that there is a possibility of the contact, avoidance path P for avoiding the contact with surrounding objects O2 and O3 is displayed, and hence avoidance path P can guide the driver.

For example, when a display for emphasizing all surrounding objects is performed for an alert, increasing the number of surrounding objects makes the driver feel the inconvenience. As discussed above, however, displaying only avoidance path P for avoiding the contact with surrounding objects O2 and O3 can reduce the inconvenience felt by the driver.

Therefore, information display device 100, an information display method, and a non-transitory recording medium storing a program that allow the alert display capable of reducing the inconvenience can be provided.

Modified Example 1

The first exemplary embodiment has exemplified the case where information display 107 displays avoidance path P when the risk exceeds the reference value. Modified example 1 describes the case where information display 107 displays the predicted risk together with avoidance path P1. In the following description, elements similar to those in the first exemplary embodiment are denoted by the same reference marks, and the descriptions of those elements are omitted.

Specifically, when the risk predicted by predictor 104 exceeds the reference value, display controller 106 causes information display 107 to display the risk.

Figure 7:
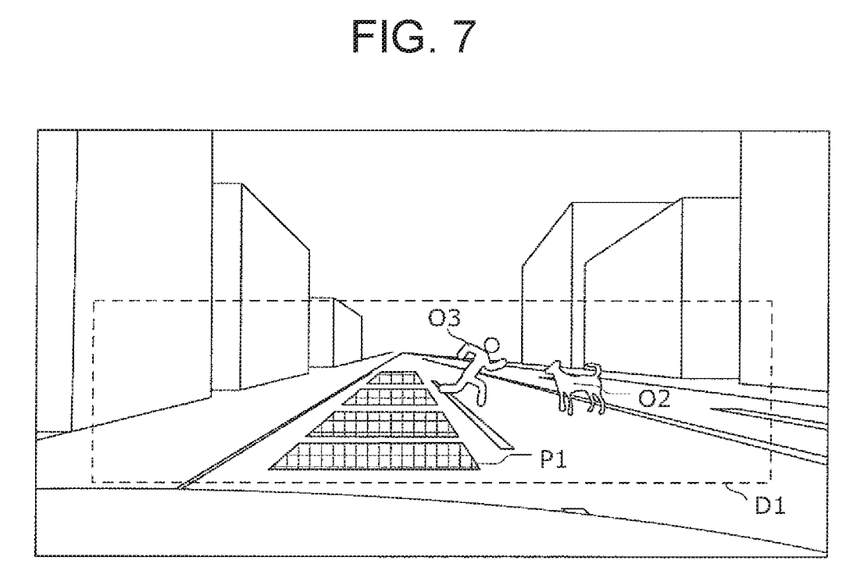
FIG. 7 is an explanatory diagram showing one example of a surrounding environment of a vehicle according to modified example 1.

FIG. 7 is an explanatory diagram showing one example of a surrounding environment of vehicle 300 according to modified example 1. As shown in FIG. 7, avoidance path P1 is displayed in display region D1. For example, when the risk of the state shown in FIG. 7 is higher than that in FIG. 6, avoidance path P1 of FIG. 7 is displayed more conspicuously than avoidance path P is. For example, avoidance path P1 is set to have a color of a high visibility, and avoidance path P is set to have a color of a visibility lower than that of avoidance path P1. For example, the color of a high visibility is red, and the color of a visibility lower than red is blue.

Furthermore, the higher the vehicle speed, the higher the risk, so that the risk may be displayed in association with the vehicle speed. For example, when the vehicle speed is classified into three levels, namely a high speed, an intermediate speed, and a low speed, the color is set red for the high speed, yellow for the intermediate speed, and blue for the low speed. Furthermore, when the vehicle speed is classified into two levels, namely a high speed and a low speed, the color is set red for the high speed, and set blue for the low speed.

Thus, information display 107 displays the risk and vehicle speed in display region D1, so that the present state can be shown to the driver in detail. Especially, in modified example 1, the risk and vehicle speed are expressed by varying the color of avoidance path P, so that the driver is hard to feel inconvenience even compared with the case where these are individually displayed.

The display of the risk and vehicle speed may have any display form as long as the driver can instantly recognize the display. For example, the risk and vehicle speed can be expressed in characters (letters), numerical values, and symbols.

Modified Example 2

The first exemplary embodiment has exemplified the case where avoidance path P is displayed when the risk exceeds the reference value. Modified example 2 describes the case where, when the risk is a predetermined value or more, deceleration request indication for requesting the driver to decelerate vehicle 300 is displayed. Here, the predetermined value means a risk higher than the reference value.

Figure 8:
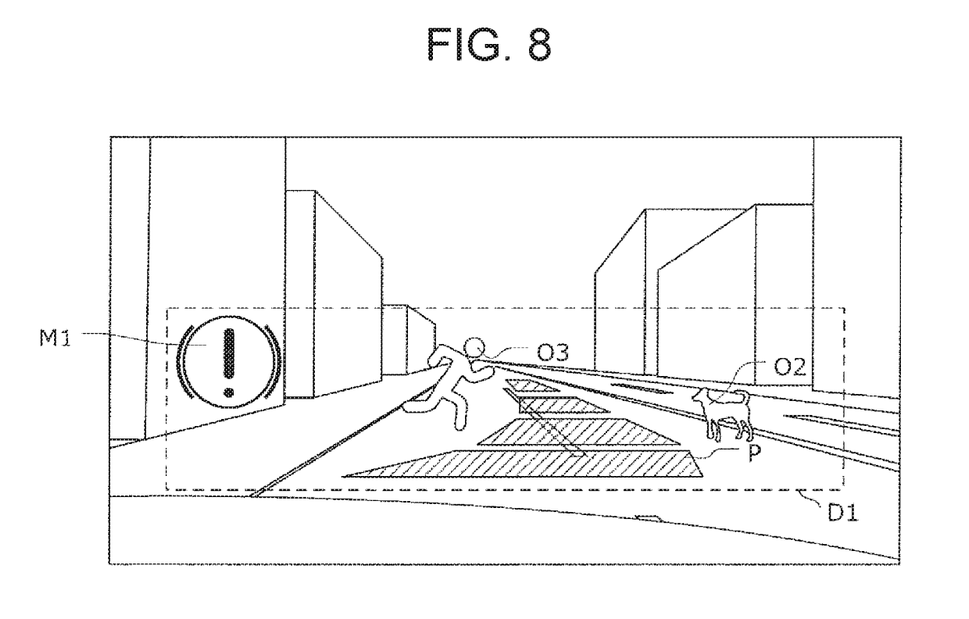
FIG. 8 is an explanatory diagram showing one example of a surrounding environment of a vehicle according to modified example 2.

FIG. 8 is an explanatory diagram showing one example of a surrounding environment of vehicle 300 according to modified example 2. As shown in FIG. 8, avoidance path P is displayed in display region D1. For example, when the risk predicted by predictor 104 in the state shown in FIG. 8 is a predetermined value or more, display controller 106 causes information display 107 to display deceleration request indication M1. Specifically, deceleration request indication M1 is a symbol used to encourage or urge the driver to perform a brake operation. Deceleration request indication M1 is desired to be displayed at a position that does not overlap with avoidance path P and is hard to disturb the driving in display region D1.

Thus, when the risk is the predetermined value or more, information display 107 displays deceleration request indication M1 in display region D1, so that the driver can be urged to perform deceleration.

The display of the deceleration request indication may have any display form as long as the driver can instantly recognize the brake operation. For example, the brake operation can be expressed in characters (letters).

Furthermore, in displaying the deceleration request indication, the display of avoidance path P may be eliminated. In this case, the number of operation candidates is narrowed to one, so that the driver's confusion in an emergency can be suppressed.

Furthermore, instead of the deceleration request indication, a warning sound request indication for requesting the driver to make a warning sound notification of vehicle 300 can be displayed.

Figure 9:
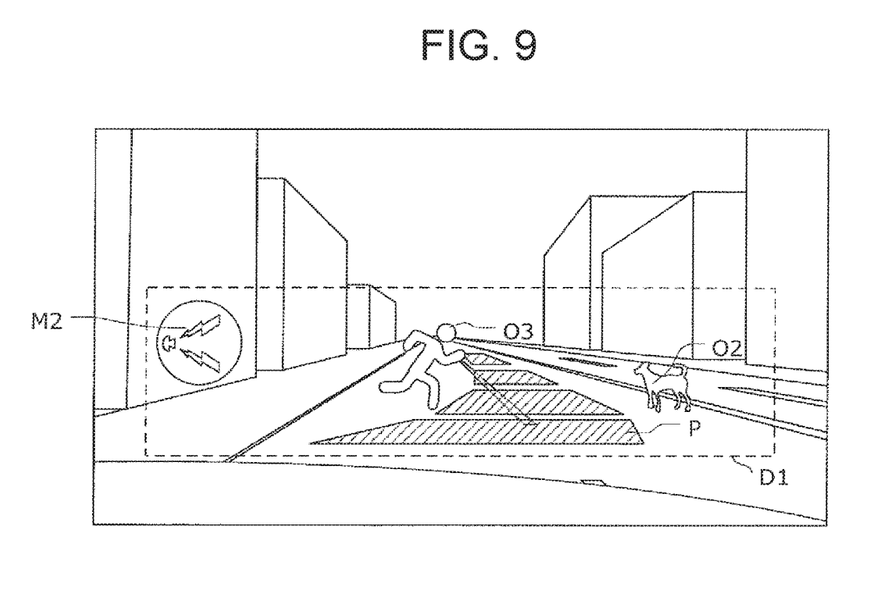
FIG. 9 is an explanatory diagram showing one example of a surrounding environment of a vehicle when warning sound request indication is displayed.

FIG. 9 is an explanatory diagram showing one example of a surrounding environment of vehicle 300 when the warning sound request indication is displayed. As shown in FIG. 9, avoidance path P is displayed in display region D1. For example, when the risk predicted by predictor 104 in the state shown in FIG. 9 is a predetermined value or more, display controller 106 causes information display 107 to display warning sound request indication M2. Specifically, warning sound request indication M2 is a symbol used to encourage or urge the driver to perform a horn operation. Warning sound request indication M2 is desired to be displayed at a position that does not overlap with avoidance path P and is hard to disturb the driving in display region D1.

Thus, when the risk is the predetermined value or more, information display 107 displays warning sound request indication M2 in display region D1, so that the driver can be urged to perform the warning sound notification.

The display of the warning sound request indication may have any display form as long as the driver can instantly recognize the horn operation. For example, the horn operation can be expressed in characters (letters).

Furthermore, in displaying the warning sound request indication, the display of avoidance path P may be eliminated. In this case, the number of operation candidates is narrowed to one, so that the driver's confusion in an emergency can be suppressed.

Furthermore, a combination of the warning sound request indication and the deceleration request indication can be displayed.

When avoidance path P cannot be assumed, avoidance path P cannot be displayed. Therefore, the deceleration request indication needs to be displayed to urge the driver to perform the deceleration.

Modified Example 3

The first exemplary embodiment has exemplified the case where avoidance path P is displayed when the risk exceeds the reference value. Modified example 3 describes the case where, when the risk is a predetermined value or more, the other device presents a warning to the driver. Here, the predetermined value means a risk higher than the reference value.

Figure 10:
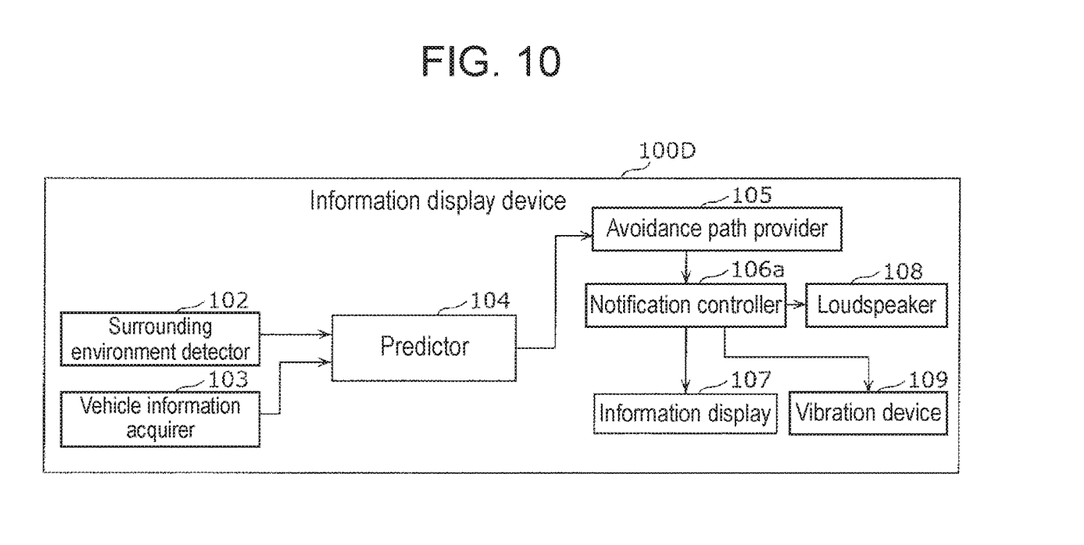
FIG. 10 is a block diagram showing one example of a functional configuration of an information display device according to modified example 3.

FIG. 10 is a block diagram showing a functional configuration of information display device 100D according to modified example 3. As shown in FIG. 10, information display device 100D includes loudspeaker 108 and vibration device 109. Vibration device 109 is disposed on the driver's seat of vehicle 300 and transmits the vibration to the driver, for example.

Notification controller 106a corresponds to display controller 106 of the first exemplary embodiment. When the risk is a predetermined value or more, notification controller 106a causes loudspeaker 108 to present a warning by a sound, and causes vibration device 109 to present a warning by a vibration. Thus, the driver can recognize the risk on the basis of the auditory warning and the tactile warning.

Thus, when the risk is the predetermined value or more, warning presentation can be performed by loudspeaker 108 and vibration device 109. Therefore, not only visual warning but also auditory warning and tactile warning can be performed. Thus, the driver can be caused to more easily recognize the risk.

Meanwhile, information display device 100D does not need to include both loudspeaker 108 and vibration device 109, but information display device 100D may include only one of them.

Furthermore, modified example 3 has exemplified the case where information display device 100D includes loudspeaker 108 and vibration device 109. However, the following configuration can be also employed: notification controller 106a of information display device 100D is communicably connected to at least one of a loudspeaker and a vibration device mounted in vehicle 300; and notification controller 106a causes at least one of the loudspeaker and the vibration device to perform the warning presentation.

The Others

In the first exemplary embodiment and the modified examples thereof, each component may be formed of dedicated hardware such as a dedicated physical circuit, or may be achieved by executing a software program appropriate to each component. Each component may be achieved by an operation in which a program execution unit such as a central processing unit (CPU) or a processor reads and executes a software program recorded in a recording medium such as a hard disc or semiconductor memory. Here, the software for achieving information display device 100 or the like of the first exemplary embodiment and the modified examples thereof includes the following program.

Specifically, this program causes the computer to execute an information display method including: detecting position relevant information related to at least a position of a surrounding object in a surrounding environment of a vehicle; detecting vehicle information including a speed and a steering direction of the vehicle; predicting a contact of the vehicle with the surrounding object on the basis of the position relevant information and the vehicle information; and assuming and displaying the avoidance path for avoiding the contact on the basis of the position relevant information and the vehicle information when it is predicted that there is a possibility of the contact.

As discussed above, the information display device and the information display method according to one or more aspects of the present disclosure have been described on the basis of the exemplary embodiments. The present disclosure is not limited to the exemplary embodiments. The following forms may be included within the range of one or more aspects of the present disclosure as long as the forms do not deviate from the scope of the present disclosure. Here, these forms include a form obtained by applying various modifications conceived by a person skilled in the art to the exemplary embodiments, or a form built by combining the components in different exemplary embodiments.

The present disclosure is useful as an information display device capable of showing valuable information to a driver.

What is claimed is:
1. An information display device comprising:
a processor; and
a memory including a program that, when executed, causes the processor to perform operations including:
acquiring position relevant information related to a position of at least a surrounding object in a surrounding environment of a vehicle;
acquiring vehicle information including a speed and a steering direction of the vehicle; and
controlling an information display to display an avoidance path for avoiding a contact of the vehicle with the surrounding object and to further display a risk of the contact, based on the position relevant information and the vehicle information.

2. The information display device according to claim 1, wherein the controlling further includes controlling the information display to display the risk in association with the speed of the vehicle.

3. The information display device according to claim 1, wherein the controlling further includes controlling, upon determining that the risk has a predetermined value or more, the information display to display deceleration request indication for requesting a driver of the vehicle to decelerate the vehicle.

4. The information display device according to claim 1, wherein the controlling further includes controlling, upon determining that the risk has a predetermined value or more, the information display to display warning sound request indication for requesting a driver of the vehicle to make a warning sound notification of the vehicle.

5. An information display method comprising:
acquiring position relevant information related to a position of at least a surrounding object in a surrounding environment of a vehicle;
acquiring vehicle information including a speed and a steering direction of the vehicle; and
controlling an information display to display an avoidance path for avoiding a contact of the vehicle with the surrounding object and to further display a risk of the contact, based on the position relevant information and the vehicle information.

6. A non-transitory recording medium storing a program causing a computer to execute:
acquiring position relevant information related to a position of at least a surrounding object in a surrounding environment of a vehicle;
acquiring vehicle information including a speed and a steering direction of the vehicle; and
controlling an information display to display an avoidance path for avoiding a contact of the vehicle with the surrounding object and to further display a risk of the contact, based on the position relevant information and the vehicle information.

* * * * *